US012566792B2

(12) United States Patent
Deng et al.

(10) Patent No.: US 12,566,792 B2
(45) Date of Patent: Mar. 3, 2026

(54) SYSTEMS AND METHODS FOR AUTOMATICALLY GENERATING IDENTIFIERS FOR MULTIMEDIA INFORMATION SETS

(71) Applicant: Lemon Inc., Grand Cayman (KY)

(72) Inventors: Lelai Deng, Beijing (CN); Junyu Dai, Beijing (CN); Xuchen Song, Los Angeles, CA (US); Shizhu Liu, Los Angeles, CA (US); Yuanjian Feng, Los Angeles, CA (US); Yufan Xue, Beijing (CN); Xiaohui Lin, Beijing (CN); Ce Gao, Beijing (CN)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 18/837,171

(22) PCT Filed: Feb. 20, 2023

(86) PCT No.: PCT/SG2023/050098
§ 371 (c)(1),
(2) Date: Aug. 8, 2024

(87) PCT Pub. No.: WO2023/158384
PCT Pub. Date: Aug. 24, 2023

(65) Prior Publication Data
US 2025/0173371 A1      May 29, 2025

(30) Foreign Application Priority Data
Feb. 21, 2022      (CN) .......................... 202210154951.9

(51) Int. Cl.
*G06F 16/00* (2019.01)
*G06F 16/48* (2019.01)
*G06F 16/638* (2019.01)

(52) U.S. Cl.
CPC ............ *G06F 16/48* (2019.01); *G06F 16/639* (2019.01)

(58) Field of Classification Search
None
See application file for complete search history.

(56) References Cited

U.S. PATENT DOCUMENTS 7,035,467 B2 * 4/2006 Nicponski .............. G06V 40/16
382/190
8,316,041 B1 * 11/2012 Chang ................... G06F 40/284
707/730

(Continued)

FOREIGN PATENT DOCUMENTS

CN      107193878 A      9/2017
CN      107463552 A      12/2017

(Continued)

OTHER PUBLICATIONS

Kim, Haven, Seungheon Doh, Junwon Lee, and Juhan Nam. "Music playlist title generation using artist information." (2023) rXiv preprint arXiv:2301.08145 (Year: 2023).*

(Continued)

*Primary Examiner* — Polina G Peach
(74) *Attorney, Agent, or Firm* — BakerHostetler

(57) ABSTRACT

Embodiments of the present disclosure provide a method, apparatus, device, storage medium, and program for information processing. The method includes: obtaining a first multimedia information set that is to be processed and includes a plurality of first multimedia information; obtaining reference information that includes a plurality of reference multimedia identifiers, one of the reference multimedia identifiers indicating a reference multimedia information set that includes a plurality of reference multimedia information; determining a multimedia identifier to be selected according to the first multimedia information set, where a (Continued)

matching degree between a multimedia feature corresponding to a reference multimedia information set indicated by the multimedia identifier to be selected and a multimedia feature corresponding to the first multimedia information set satisfies a predetermined condition; and determining, according to the multimedia identifier to be selected, a target multimedia identifier corresponding to the first multimedia information set.

18 Claims, 6 Drawing Sheets

(56) References Cited

U.S. PATENT DOCUMENTS

| | | | | |
|---|---|---|---|---|
| 8,953,228 | B1 * | 2/2015 | Mehers | G06V 30/1456 |
| | | | | 705/14.1 |
| 10,657,098 | B2 * | 5/2020 | Allen | G06F 16/242 |
| 10,957,290 | B2 * | 3/2021 | Nazer | G06F 40/242 |
| 2002/0159640 | A1 * | 10/2002 | Vaithilingam | G06F 16/48 |
| | | | | 382/218 |
| 2003/0128877 | A1 * | 7/2003 | Nicponski | G06F 18/2411 |
| | | | | 382/190 |
| 2004/0078383 | A1 | 4/2004 | Mercer et al. | |
| 2006/0230331 | A1 * | 10/2006 | Abanami | G06Q 30/02 |
| | | | | 715/234 |
| 2007/0055697 | A1 * | 3/2007 | Luo | G06F 16/58 |
| | | | | 382/224 |
| 2007/0067157 | A1 * | 3/2007 | Kaku | G06F 40/289 |
| | | | | 704/10 |
| 2009/0150445 | A1 | 6/2009 | Herberger et al. | |
| 2010/0057694 | A1 * | 3/2010 | Kunjithapatham | G06F 16/70 |
| | | | | 707/E17.014 |
| 2010/0082615 | A1 * | 4/2010 | Clinchant | G06F 16/58 |
| | | | | 707/E17.046 |
| 2010/0226582 | A1 * | 9/2010 | Luo | G06F 16/58 |
| | | | | 382/224 |
| 2010/0278396 | A1 * | 11/2010 | Mitsuhashi | G06F 16/583 |
| | | | | 382/118 |
| 2011/0314367 | A1 * | 12/2011 | Chang | G06F 16/437 |
| | | | | 715/230 |
| 2012/0232681 | A1 * | 9/2012 | Mundy | G06F 16/4387 |
| | | | | 707/738 |
| 2012/0269436 | A1 * | 10/2012 | Mensink | G06V 10/764 |
| | | | | 382/180 |
| 2012/0281887 | A1 * | 11/2012 | Yamaguchi | G06F 16/5838 |
| | | | | 382/118 |
| 2012/0296908 | A1 * | 11/2012 | Bach | G06F 16/683 |
| | | | | 707/E17.089 |
| 2014/0328570 | A1 * | 11/2014 | Cheng | G06F 16/43 |
| | | | | 386/241 |
| 2015/0055854 | A1 * | 2/2015 | Marchesotti | G06F 18/2178 |
| | | | | 382/159 |
| 2015/0169542 | A1 * | 6/2015 | Lin | H04N 21/8405 |
| | | | | 725/53 |
| 2015/0169952 | A1 * | 6/2015 | O'Malley | G06F 18/28 |
| | | | | 382/225 |
| 2015/0310011 | A1 * | 10/2015 | Poulet | G06F 16/433 |
| | | | | 707/722 |
| 2016/0328096 | A1 * | 11/2016 | Tran | G06F 16/48 |
| 2016/0343088 | A1 * | 11/2016 | Bhasin | H04L 67/306 |
| 2017/0329697 | A1 * | 11/2017 | Dillinger | G06F 8/75 |
| 2017/0330540 | A1 * | 11/2017 | Quattro | G06F 16/683 |
| 2018/0124437 | A1 * | 5/2018 | Memisevic | G06N 3/044 |
| 2019/0332867 | A1 * | 10/2019 | Zhang | G06V 10/82 |
| 2019/0354578 | A1 * | 11/2019 | Shen | G06F 40/40 |
| 2020/0151585 | A1 * | 5/2020 | Ishida | G06V 10/82 |
| 2020/0336802 | A1 * | 10/2020 | Russell | G06N 20/00 |
| 2020/0364338 | A1 * | 11/2020 | Ducau | G06F 21/564 |
| 2020/0372066 | A1 * | 11/2020 | Saggi | G06N 20/00 |
| 2021/0034657 | A1 * | 2/2021 | Kale | G06V 20/35 |
| 2021/0124997 | A1 * | 4/2021 | Kondou | G06F 18/23 |
| 2021/0271707 | A1 * | 9/2021 | Lin | G06F 40/216 |
| 2022/0067576 | A1 * | 3/2022 | Saha | G06F 16/24573 |
| 2022/0237373 | A1 * | 7/2022 | Singh Bawa | G06N 20/00 |
| 2022/0292685 | A1 * | 9/2022 | Heisler | G06T 7/11 |
| 2022/0350838 | A1 * | 11/2022 | Henderson | G06F 16/68 |
| 2023/0402065 | A1 * | 12/2023 | Gu | G11B 27/34 |
| 2023/0409633 | A1 * | 12/2023 | Lebecque | G06F 16/635 |

FOREIGN PATENT DOCUMENTS

| | | |
|---|---|---|
| CN | 107193878 B | 3/2020 |
| CN | 111125387 A | 5/2020 |
| CN | 112487236 A | 3/2021 |
| CN | 110096571 B | 6/2021 |
| CN | 113282788 A | 8/2021 |
| CN | 113569064 A | 10/2021 |

OTHER PUBLICATIONS

Yun Hao, "Towards a Better Understanding of Music Playlist Titles and Descriptions", 2021, University of Illinois Urbana-Champaign (Year: 2021).*

International Patent Application No. PCT/SG2023/050098; Int'l Search Report; dated Sep. 20, 2023; 3 pages.

European Patent Application No. 23756738.3; Extended European Search Report dated Feb. 28, 2025, 8 pages.

* cited by examiner

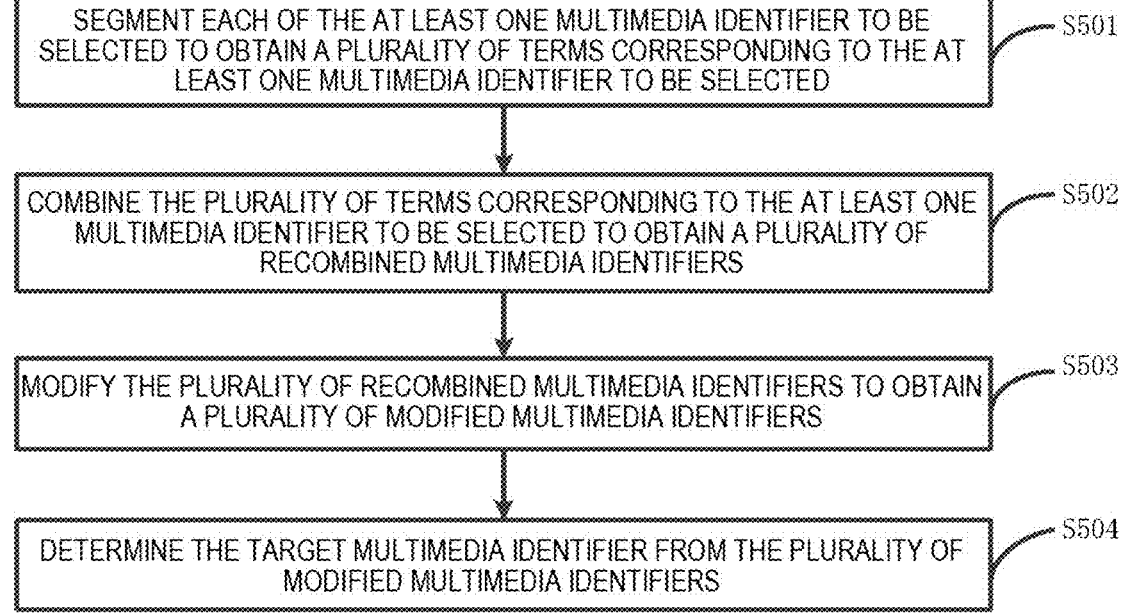

SEGMENT EACH OF THE AT LEAST ONE MULTIMEDIA IDENTIFIER TO BE SELECTED TO OBTAIN A PLURALITY OF TERMS CORRESPONDING TO THE AT LEAST ONE MULTIMEDIA IDENTIFIER TO BE SELECTED — S501

COMBINE THE PLURALITY OF TERMS CORRESPONDING TO THE AT LEAST ONE MULTIMEDIA IDENTIFIER TO BE SELECTED TO OBTAIN A PLURALITY OF RECOMBINED MULTIMEDIA IDENTIFIERS — S502

MODIFY THE PLURALITY OF RECOMBINED MULTIMEDIA IDENTIFIERS TO OBTAIN A PLURALITY OF MODIFIED MULTIMEDIA IDENTIFIERS — S503

DETERMINE THE TARGET MULTIMEDIA IDENTIFIER FROM THE PLURALITY OF MODIFIED MULTIMEDIA IDENTIFIERS — S504

FIG. 5

SYSTEMS AND METHODS FOR AUTOMATICALLY GENERATING IDENTIFIERS FOR MULTIMEDIA INFORMATION SETS

CROSS-REFERENCE

This disclosure is the U.S. National Stage of International Application No. PCT/SG2023/050098, filed on Feb. 20, 2023, which claims priority to Chinese Patent Application No. 202210154951.9, filed on Feb. 21, 2022, and entitled "METHOD, APPARATUS, DEVICE, STORAGE MEDIUM AND PROGRAM FOR INFORMATION PROCESSING", which are incorporated herein by reference in their entireties.

FIELD

Embodiments of the present disclosure relate to the technical field of multimedia, and in particular, to a method, apparatus, device, storage medium, and program for information processing.

BACKGROUND

With the development of multimedia technologies, scenarios in which a user uses multimedia information by means of a terminal device increase gradually. For example, the user may watch a video, listen to music, read a book, and/or the like by means of the terminal device.

In some application scenarios, multimedia information may be managed in groups. Music is taken as an example for the purpose of illustration. A music platform may combine songs in a database in diversified approaches, form a plurality of songs into a song list, and push the song list to a user. In addition, the user may also create a plurality of songs as a song list according to his/her own preferences.

After music is managed in the form of a song list, a song list name needs to be determined for each song list. In the related art, a song list name needs to be determined manually. In this way, on one hand, a lot of manpower and time costs need to be consumed, and on the other hand, quality of the song list name cannot be ensured.

SUMMARY

Embodiments of the present disclosure provide a method, apparatus, device, storage medium and program for information processing.

In a first aspect, an embodiment of the present disclosure provides a method of information processing, including:

obtaining a first multimedia information set to be processed, the first multimedia information set including a plurality of first multimedia information;

obtaining reference information, the reference information including a plurality of reference multimedia identifiers, one of the reference multimedia identifiers being used to indicate a reference multimedia information set, and the reference multimedia information set including a plurality of reference multimedia information;

determining at least one multimedia identifier to be selected, from the plurality of reference multimedia identifiers according to the first multimedia information set, a matching degree between a multimedia feature corresponding to a reference multimedia information set indicated by the at least one multimedia identifier to be selected and a multimedia feature corresponding to the first multimedia information set satisfying a predetermined condition; and determining, according to the at least one multimedia identifier to be selected, a target multimedia identifier corresponding to the first multimedia information set.

In a second aspect, an embodiment of the present disclosure provides an apparatus for information processing, including:

a first obtaining module configured to obtain a first multimedia information set to be processed, the first multimedia information set including a plurality of first multimedia information;

a second obtaining module configured to obtain reference information, the reference information including a plurality of reference multimedia identifiers, one of the reference multimedia identifiers being used to indicate a reference multimedia information set, the reference multimedia information set including a plurality of reference multimedia information;

a first determining module configured to determine at least one multimedia identifier to be selected, according to the first multimedia information set, from the plurality of reference multimedia identifiers, a matching degree between a multimedia feature corresponding to a reference multimedia information set indicated by the at least one multimedia identifier to be selected and a multimedia feature corresponding to the first multimedia information set satisfying a predetermined condition; and a second determining module configured to determine, according to the at least one multimedia identifier to be selected, a target multimedia identifier corresponding to the first multimedia information set.

In a third aspect, an embodiment of the present disclosure provides an electronic device, including: a processor and a memory;

the memory storing computer executable instructions; and the processor executing the computer executable instructions to implement the method of information processing in the first aspect and in various possible implementations of the first aspect.

In a fourth aspect, an embodiment of the present disclosure provides a computer readable storage medium storing computer executable instructions, the computer executable instructions, when executed by a processor, implementing the method of information processing in the first aspect and in various possible implementations of the first aspect.

In a fifth aspect, an embodiment of the present disclosure provides a computer program product including a computer program, the computer program, when executed by a processor, implementing the method of information processing in the first aspect and in various possible implementations of the first aspect.

In a sixth aspect, an embodiment of the present disclosure provides a computer program the computer program, when executed by a processor, implementing the method of information processing in the first aspect and in various possible implementations of the first aspect.

Embodiments of the present disclosure provide a method, apparatus, device, storage medium and program for information processing. The method includes: obtaining a first multimedia information set to be processed, the first multimedia information set including a plurality of first multimedia information; obtaining reference information, the reference information including a plurality of reference multimedia identifiers, one of the reference multimedia identifiers being used to indicate a reference multimedia information set, and the reference multimedia information set including a plurality of reference multimedia information; determining at least one multimedia identifier to be selected, from the plurality of reference multimedia identifiers according to the first multimedia information set, a matching degree between a multimedia feature corresponding to a reference multimedia information set indicated by the at least one multimedia identifier to be selected and a multimedia feature corresponding to the first multimedia information set satisfying a predetermined condition; and determining, according to the at least one multimedia identifier to be selected, a target multimedia identifier corresponding to the first multimedia information set.

BRIEF DESCRIPTION OF THE DRAWINGS

In order to more clearly illustrate the technical solutions in the embodiments of the present disclosure or in the prior art, the following will briefly introduce the accompanying drawings that need to be used in the description of the embodiments or the prior art. It will be obvious that the accompanying drawings in the following description are some of the embodiments of the present disclosure. For the person of ordinary skill in the art, other accompanying drawings may also be obtained according to these drawings, without creative efforts.

FIG. 5 is a schematic flowchart of yet another method of information processing according to an embodiment of the present disclosure;

DETAILED DESCRIPTION

In order to make the objects, technical solutions and advantages of the embodiments of the present disclosure more apparent, the technical solutions in the embodiments of the present disclosure will be described clearly and completely in the following in connection with the accompanying drawings in the embodiments of the present disclosure. It is obvious that the described embodiments are only a part of the embodiments of the present disclosure, and not all of the embodiments. All other embodiments obtained by persons of ordinary skill in the art based on the embodiments of the present disclosure without creative efforts fall within the scope of protection of the present disclosure.

The present disclosure provides a method, apparatus, device, storage medium and program for information processing, which can be applied to a scenario where a target multimedia name corresponding to a first multimedia information set needs to be determined. The first multimedia information set includes a plurality of first multimedia information. In the technical solution provided by the present disclosure, a target multimedia identifier corresponding to the first multimedia information set can be automatically determined according to a plurality of reference multimedia identifiers. In this way, on one hand, manpower and time are saved, and on the other hand, the quality of the target multimedia identifier is improved.

In an embodiment of the present disclosure, the multimedia information includes, but is not limited to, an audio, a text, an image, a video, etc. For example, the first multimedia information set may be a song list, or a book list, or a set of videos, or a set of images.

The multimedia identifier corresponding to the first multimedia information set refers to information used to identify the first multimedia information set. The multimedia identifier may also be referred to as a multimedia name. For example, when the first multimedia information set is a song list, the multimedia identifier corresponding to the first multimedia information set may be a song list name. It should be noted that a form of the multimedia identifier is not limited in the embodiments of the present disclosure, and as an example, it may be terms, phrases, sentences, paragraphs and/or the like.

An application scenario of embodiments of the present invention will be described below by taking the first multimedia information set being a song list as an example.

Figure 1:
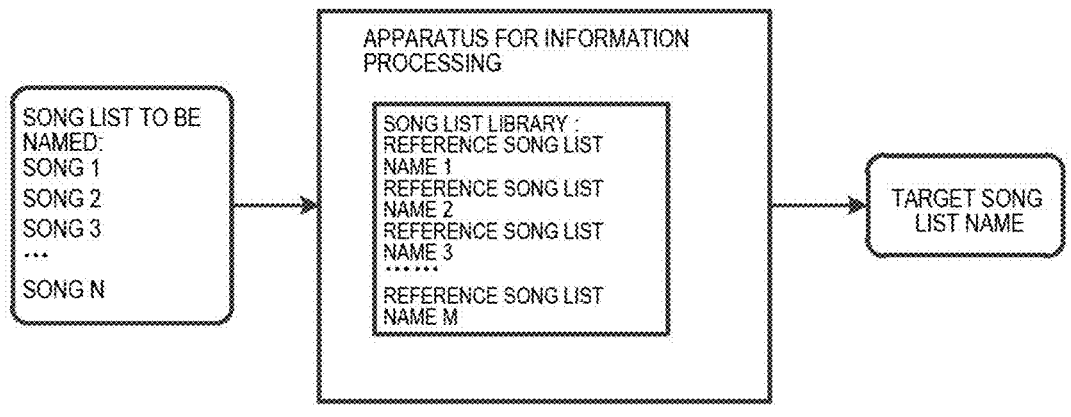
FIG. 1 is a schematic diagram of an application scenario according to an embodiment of the present disclosure.

FIG. 1 is a schematic diagram of an application scenario provided in an embodiment of the present disclosure. As shown in FIG. 1, it is assumed that a certain song list needs to be named. A song list to be named includes: a song 1, a song 2, a song 3, . . . , and a song N. The song list to be named is input into an apparatus for information processing, and the apparatus of information processing can determine a target song list name corresponding to the song list to be named with reference to various reference song list names in a song list library.

It should be understood that the apparatus of information processing may be a terminal device or a server, and may also be an apparatus integrated into the terminal device or the server. The terminal device may be any electronic device having a multimedia interaction function, including, but not limited to, a smartphone, a tablet computer, a notebook computer, a smart television, a smart wearable device, a smart home device, a smart vehicle-mounted device, a smart speaker, and/or the like. In the following figures, when a display page of a terminal device is illustrated, a mobile page is taken as an example for illustration. A server may be a cloud server, and is also referred to as a cloud computing server or a cloud host, and is a host product in a cloud computing service system. The server may also be a server of a distributed system, or a server combined with a block chain.

The technical solutions of the present disclosure will be described in detail below with reference to specific embodiments. The following specific embodiments may be combined with each other, and the same or similar concepts or processes may not be repeated in some embodiments.

Figure 2:
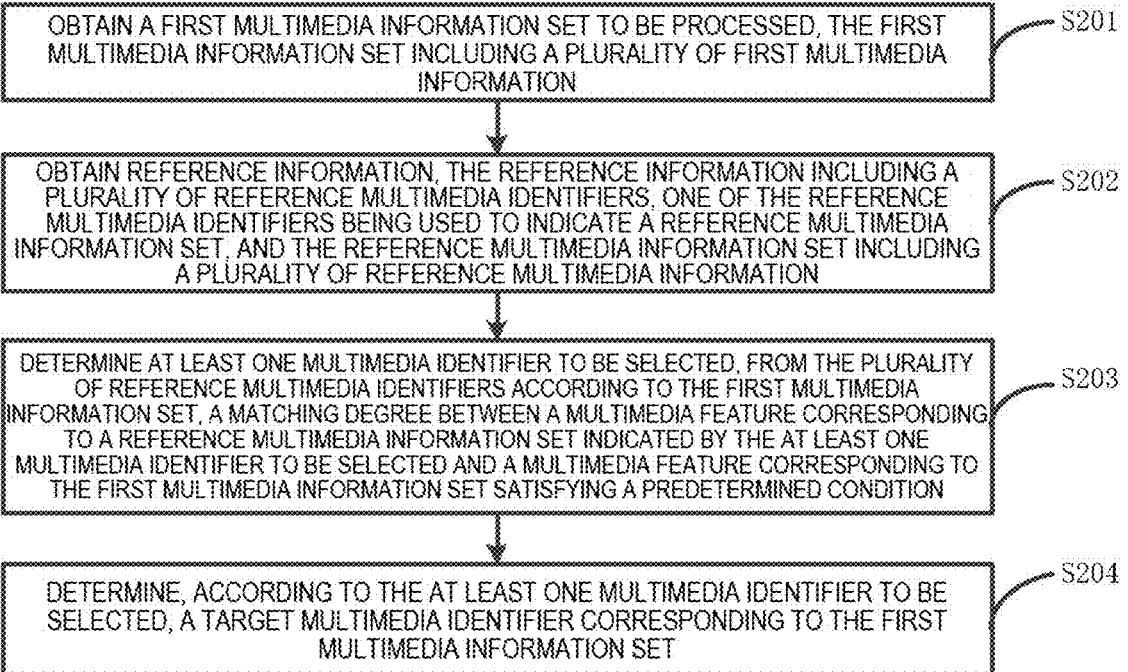
FIG. 2 is a schematic flowchart of a method of information processing according to an embodiment of the present disclosure.

FIG. 2 is a schematic flowchart of a method of information processing according to an embodiment of the present disclosure. The executing entity of this embodiment may be a device for information processing. As shown in FIG. 2, the method in this embodiment includes:

In S201, a first multimedia information set to be processed is obtained, where the first multimedia information set includes a plurality of first multimedia information.

Alternatively, the first multimedia information is any one of the following: an audio, a text, an image, or a video. In the case that the first multimedia information is an audio, the first multimedia information set may include a plurality of songs, a plurality of operas, and/or the like. In the case that the first multimedia information is a text, the first multimedia information set may include a plurality of texts, for example, a plurality of articles, a plurality of books, and/or the like. In the case that the first multimedia information is an image, the first multimedia information set may include a plurality of images. In the case that the first multimedia information is a video, the first multimedia information set may include a plurality of videos, for example, a plurality of TV plays, a plurality of movies, a plurality of small videos, and/or the like.

In this embodiment, the first multimedia information set is a multimedia information set to be named. That is, a target multimedia identifier needs to be determined for the first multimedia information set. The target multimedia identifier is used to reflect a feature of each piece of first multimedia information in the first multimedia information set.

For example, assuming that the first multimedia information set includes a plurality of songs, the first multimedia information set may be referred to as a song list. By using the method of the present embodiment, a song list name can be generated for the song list, and the song list name is used for reflecting a feature of a song in the song list.

In S202, reference information is obtained, where the reference information includes a plurality of reference multimedia identifiers, one of the reference multimedia identifiers is used for indicating a reference multimedia information set, and the reference multimedia information set includes a plurality of reference multimedia information.

In this embodiment, the reference information refers to information that needs to be referenced in the process of automatically determining the target multimedia identifier corresponding to the first multimedia information set. In the reference information, each of the plurality of reference multimedia information sets corresponds to a multimedia identifier. Taking the first multimedia information set being a song list as an example, the reference information may be referred to as a song list library, and the song list library includes a plurality of reference song list names corresponding to the plurality of reference song lists. Each reference song list includes a plurality of reference songs.

In S203, at least one multimedia identifier to be selected is determined from the plurality of reference multimedia identifiers according to the first multimedia information set, where a matching degree between a multimedia feature corresponding to a reference multimedia information set indicated by the multimedia identifier to be selected and a multimedia feature corresponding to the first multimedia information set satisfies a predetermined condition.

In an example, feature extraction may be performed on the first multimedia information set to obtain a multimedia feature corresponding to the first multimedia information set. Furthermore, for each reference multimedia identifier in the reference information, feature extraction is performed on the reference multimedia information set indicated by the reference multimedia identifier to obtain a multimedia feature corresponding to the reference multimedia information set indicated by the reference multimedia identifier. In addition, a matching degree between the multimedia feature corresponding to the first multimedia information set and the multimedia feature corresponding to the reference multimedia information set indicated by each reference multimedia identifier may be determined, and at least one multimedia identifier to be selected is determined among the plurality of reference multimedia identifiers according to the matching degree.

Specifically, the reference multimedia identifier whose matching degree meets the predetermined condition may be determined as a multimedia identifier to be selected. For example, for each reference multimedia identifier, if the matching degree between the multimedia feature corresponding to the reference multimedia information set indicated by the reference multimedia identifier and the multimedia feature corresponding to the first multimedia information set is greater than or equal to a predetermined threshold, the reference multimedia identifier is determined as the multimedia identifier to be selected.

It should be noted that if the forms of the first multimedia information are different, the corresponding feature extraction approaches are generally different. A feature extraction approach is not limited in this embodiment.

Taking the first multimedia information set being a song list as an example, features of songs in the song list may be extracted from a plurality of dimensions to obtain a multimedia feature corresponding to the first multimedia information set. The plurality of dimensions include, but are not limited to, styles, emotions, and types. In other terms, the multimedia features corresponding to the first multimedia information set include features in one or more dimensions of styles, emotions, and types.

In an example, feature extraction approaches such as Mel-Frequency Cepstral Coefficients (MFCC) and Filter Banks (Fbanks) may be used to extract and obtain a feature of a song in the song list to be named.

It should be understood that with reference to the extraction approach of the multimedia feature corresponding to the multimedia information set, the extraction approach of the multimedia feature corresponding to the first multimedia information set is similar, and details thereof are not repeated.

S204: a target multimedia identifier corresponding to the first multimedia information set is determined according to the at least one multimedia identifier to be selected.

In this embodiment, if the target multimedia identifier corresponding to the first multimedia information set is determined, the target multimedia identifier may be determined with reference to each multimedia identifier to be selected. In an example, a target multimedia identifier may be determined from the at least one multimedia identifier to be selected. In another example, the at least one multimedia identifier to be selected may be processed to obtain a plurality of processed multimedia identifiers to be selected, and a target multimedia identifier is determined among the plurality of processed multimedia identifiers to be selected.

For ease of description and understanding, a song list is taken as an example of the first multimedia information set. According to the song list to be named, at least one song list name to be selected can be determined from a plurality of reference song list names stored in the song list library (namely, reference information), and the matching degree between the song list feature of the reference song list indicated by the song list name to be selected and the song list feature of the song list to be named satisfies a predetermined condition. Furthermore, a target song list name of a song list to be named is determined according to each song list name to be selected. For example, a certain song list name to be selected is used as the target song list name; or a certain list name to be selected is modified to obtain a target song list name; or recombination and modification are performed on the plurality of song list names to be selected to obtain the target song list name.

Several application scenarios of this embodiment will be described below by using a song list as an example.

In an example scenario, a device for information processing performs clustering on songs in a song library to form a plurality of clusters. A plurality of songs included in each cluster form a song list, so as to obtain a plurality of song lists. Then, the device for information processing executes the method of the embodiment for each first song list in the plurality of song lists, obtains a song list name corresponding to the first song list, and sets the first song list name as the song list name. In the example scenario, the device for information processing may be a server.

In another example scenario, in response to an operation request for creating a song list inputted by a user, a device for information processing determines a first song list to be created according to the operation request. In addition, the method of the embodiment is performed for the first song list to obtain a song list name corresponding to the first song list. The device for information processing sets the first song list name as the song list name, or displays the song list name. In the example scenario, the device for information processing may be a terminal device.

In yet another example scenario, in response to an operation request for creating a song list inputted by a user, a terminal device determines a first song list to be created, and generates a request for naming a song list. The request for naming a song list includes the first song list. The device for information processing receives a song list naming request sent by a terminal device. The device for information processing performs the method of the embodiment according to the first song list to obtain a song list name corresponding to the first song list. The device for information processing sends the song list name to the terminal device, and the terminal device displays the song list name, or sets the first song list name to be the song list name. In the example scenario, the device for information processing may be a server.

It should be noted that an execution order of S201 to S202 is not limited in this embodiment, and the execution order of the two steps may be interchanged, or the two steps may also be executed at the same time.

The method of information processing provided by this embodiment includes: obtaining a first multimedia information set to be processed, the first multimedia information set including a plurality of first multimedia information; obtaining reference information, the reference information including a plurality of reference multimedia identifiers, one of the reference multimedia identifiers being used to indicate a reference multimedia information set, and the reference multimedia information set including a plurality of reference multimedia information; determining at least one multimedia identifier to be selected, from the plurality of reference multimedia identifiers according to the first multimedia information set, a matching degree between a multimedia feature corresponding to a reference multimedia information set indicated by the at least one multimedia identifier to be selected and a multimedia feature corresponding to the first multimedia information set satisfying a predetermined condition; and determining, according to the at least one multimedia identifier to be selected, a target multimedia identifier corresponding to the first multimedia information set. By the described process, the target multimedia identifier corresponding to the first multimedia information set can be automatically determined according to the plurality of reference multimedia identifiers. In this way, on one hand, manpower and time are saved, and on the other hand, the quality of the target multimedia identifier is improved.

Based on the embodiment shown in FIG. 2, the implementation of S203 in the embodiment shown in FIG. 2 will be described in detail with reference to a specific embodiment.

Figure 3:
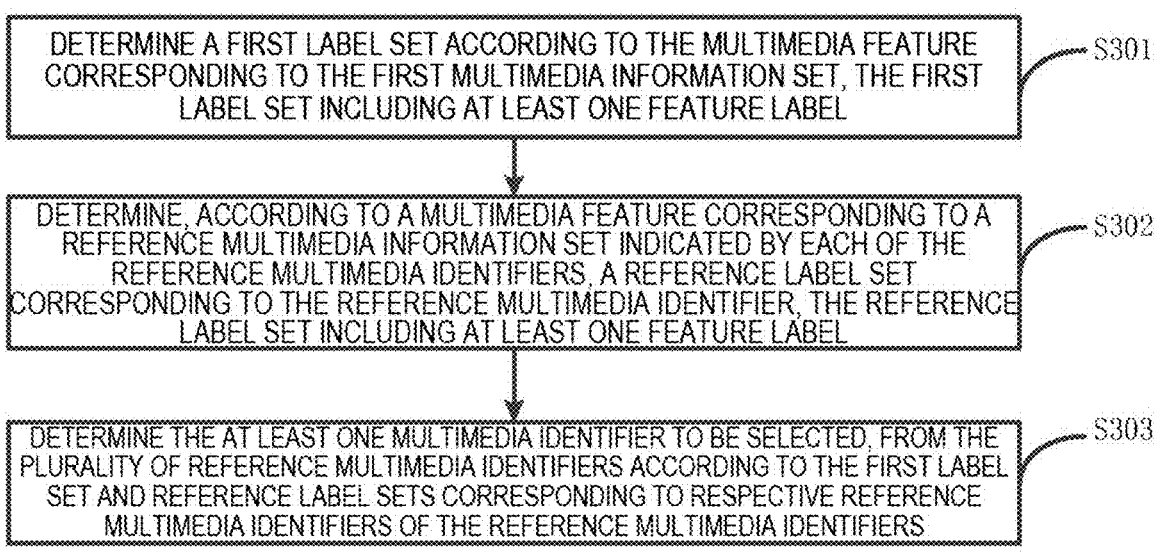
FIG. 3 is a schematic flowchart of another method of information processing according to an embodiment of the present disclosure.

FIG. 3 is a schematic flowchart of another method of information processing according to an embodiment of the present disclosure. As shown in FIG. 3, the method of this embodiment includes:

In S301, a first label set is determined according to a multimedia feature corresponding to the first multimedia information set, where the first label set includes at least one feature label.

In this embodiment, the feature label refers to a category obtained by categorizing a multimedia feature. In other terms, the feature label may be used to indicate a category of the multimedia feature. The multimedia features may be classified in a plurality of dimensions to obtain a plurality of feature labels.

For ease of understanding, an example of an approach of determining the multimedia identifier to be selected will be described below with reference to FIG. 4.

Figure 4:
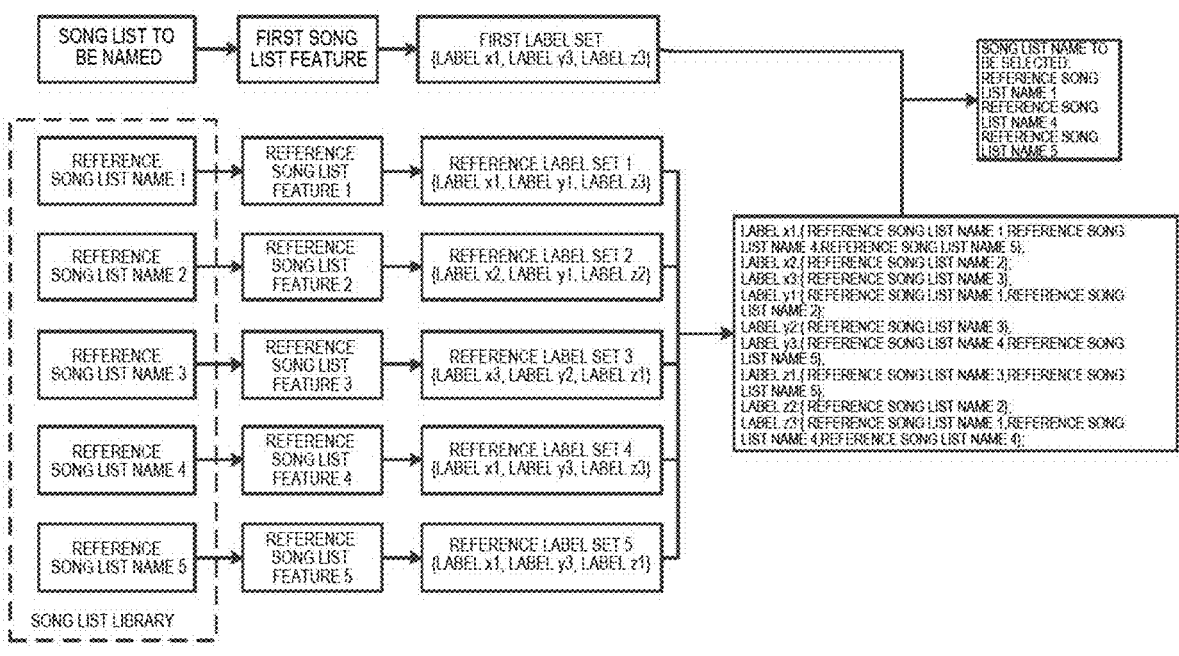
FIG. 4 is a schematic diagram of a process of determining a multimedia identifier to be selected according to an embodiment of the present disclosure.

FIG. 4 is a schematic diagram of a process for determining a multimedia identifier to be selected according to an embodiment of the present disclosure. As shown in FIG. 4, the first song list feature (namely, the multimedia feature corresponding to the first multimedia information set) is a song list feature obtained by performing feature extraction on the song list to be named. The first song list feature may be classified in a plurality of dimensions such as styles, emotions, and types, to obtain the first label set. The first label set includes feature labels corresponding to the respective dimensions, where the feature labels corresponding to the style dimension include, but are not limited to, Chinese style, epidemic, classical, hip-hop, and/or the like. The feature labels corresponding to the emotional dimension include, but are not limited to, neutral, cheering, calm, sinking, sad, and/or the like. The feature labels corresponding to the type dimension include, but are not limited to, country, disco, heavy metals, and rhythm brews (R&B).

For example, assuming that a feature label obtained by performing classification on the first song list feature in the style dimension is "Chinese style", a feature label obtained by performing classification on the first song list feature in the emotion dimension is "cheer", and a feature label obtained by performing classification on the first song list feature in the type dimension is "country", the first label set is {Chinese style, cheer, country}.

Referring to FIG. 4, for the purpose of discussions, assuming that for the first song list feature, a feature label obtained in the style dimension is x1, a feature label obtained in the emotion dimension is y3, and a feature label obtained in the type dimension is z3, the first label set is recorded as {label x1, label y3, label z3}.

In S302, a reference label set corresponding to the reference multimedia identifier is determined according to a multimedia feature corresponding to a reference multimedia information set indicated by each of the reference multimedia identifiers, where the reference label set includes at least one feature label.

Similar to S301, the multimedia feature corresponding to the reference multimedia information set indicated by each of the reference multimedia identifiers may be classified to obtain the reference label set corresponding to the reference multimedia identifier. In this way, a plurality of reference label sets may be obtained.

Still with reference to FIG. 4, for each reference song list in the song list library, classification is performed on a reference song list feature corresponding to the reference song list in a plurality of dimensions such as styles, emotions, and types, so as to obtain a reference label set. For example:

reference label set 1 obtained by reference song list 1 is {label x1, label y1, label z3};

reference label set 2 obtained by reference song list 2 is {label x2, label y1, label z2};

reference label set 3 obtained by reference song list 3 is {label x3, label y2, label z1};

reference label set 4 obtained by reference song list 4 is {label x1, label y3, label z3};

reference label set 5 obtained by reference song list 5 is {label x1, label y3, label z1}.

In S303, the at least one multimedia identifier to be selected is determined from the plurality of reference multimedia identifiers according to the first label set and reference label sets corresponding to respective reference multimedia identifiers of the reference multimedia identifiers.

In a possible implementation, at least one multimedia identifier to be selected may be determined in the following way:

(1) A plurality of reference feature labels are determined according to reference label sets corresponding to respective reference multimedia identifiers of the reference multimedia identifiers, where a repeated feature label is absent in the plurality of reference feature labels.

In an example, a plurality of reference feature labels may be obtained by performing deduplication on feature labels in the reference label sets corresponding to the respective reference multimedia identifiers.

For example, with reference to FIG. 4, deduplication is performed on feature labels in a plurality of reference label sets, and the obtained plurality of reference feature labels are: label x1, label x2, label x3, label y1, label y2, label y3, label z1, label z2, and label z3.

(2) A set of reference multimedia identifiers corresponding to each of the reference feature label is determined according to the respective reference multimedia identifiers and the reference label sets corresponding to the respective reference multimedia identifiers.

In an example, a set of reference multimedia identifiers corresponding to each reference feature label is determined in the following way: for each reference multimedia identifier, it is determined whether a reference label set corresponding to the reference multimedia identifier includes the reference feature label; and if so, the reference multimedia identifier is added to the set of reference multimedia identifiers corresponding to the reference feature label.

Still with continued reference to FIG. 4, in the above way, it may be determined that a reference song list name set corresponding to each reference feature label is as follows:

label x1: {reference song list name 1, reference song list name 4, reference song list name 5};

label x2: {reference song list 2};

label x3: {reference song list name 3};

label y1: {reference song list 1, reference song list 2};

label y2: {reference song list name 3};

label y3: {reference song list name 4, reference song list name 5};

Label z1: {reference song list name 3, reference song list name 5};

Label z2: {reference song list name 2};

label z3: {reference song list name 1, reference song list name 4}.

(3) The at least one multimedia identifier to be selected is determined from the plurality of reference multimedia identifiers according to the first label set and the set of reference multimedia identifiers corresponding to each of the reference feature labels.

In an example, at least one target feature label is determined from the plurality of reference feature labels according to the first label set, where the target feature label belongs to the first label set; and the at least one multimedia identifier to be selected is determined according to the set of reference multimedia identifiers corresponding to the at least one target feature label. For example, the reference multimedia identifier in the set of reference multimedia identifiers corresponding to the at least one target feature label may be de-duplicated to obtain at least one multimedia identifier to be selected.

For example, with reference to FIG. 4, since the first label set is {label x1, label y3, label z3}, the reference song list name set corresponding to the label x1 is {reference song list name 1, reference song list name 4, reference song list name 5}, the reference song list name set corresponding to the label y3 is {reference song list name 4, reference song list name 5}, and the reference song list name set corresponding to the label z3 is {reference song list name 1, reference song list name 4}. De-duplication is performed on the song list names in the above three reference song list name sets to obtain three song list names to be selected, which are: reference song list name 1, reference song list name 4 and reference song list name 5, respectively.

In the method of information processing provided in this embodiment, by a first label set corresponding to a first multimedia information set and the reference label sets corresponding to the respective reference multimedia identifiers, at least one multimedia identifier to be selected is determined from the plurality of reference multimedia identifiers, thereby ensuring the matching between a multimedia feature corresponding to a reference multimedia information set indicated by the determined multimedia identifier to be selected and a multimedia feature corresponding to the first multimedia information set. Further, a target multimedia identifier is determined according to the at least one multimedia identifier to be selected, thereby improving the quality of the target multimedia identifier.

Based on any of the above embodiments, the implementation of S204 in the embodiment shown in FIG. 2, that is, how to determine a target multimedia identifier according to at least one multimedia identifier to be selected, will be described in detail in the following with reference to a specific embodiment.

FIG. 5 is a schematic flowchart of yet another method of information processing according to an embodiment of the present disclosure. As shown in FIG. 5, the method of this embodiment includes:

In S501, each of the at least one multimedia identifier to be selected is segmented to obtain a plurality of terms corresponding to the multimedia identifier to be selected.

In this embodiment, a term segmentation algorithm may be used to segment each multimedia identifier to be selected to obtain a plurality of terms corresponding to the multimedia identifier to be selected.

For ease of understanding, taking the song list name as an example, an example of the process for determining the target multimedia identifier according to the multimedia identifier to be selected will be discussed with reference to FIG. 6.

Figure 6:
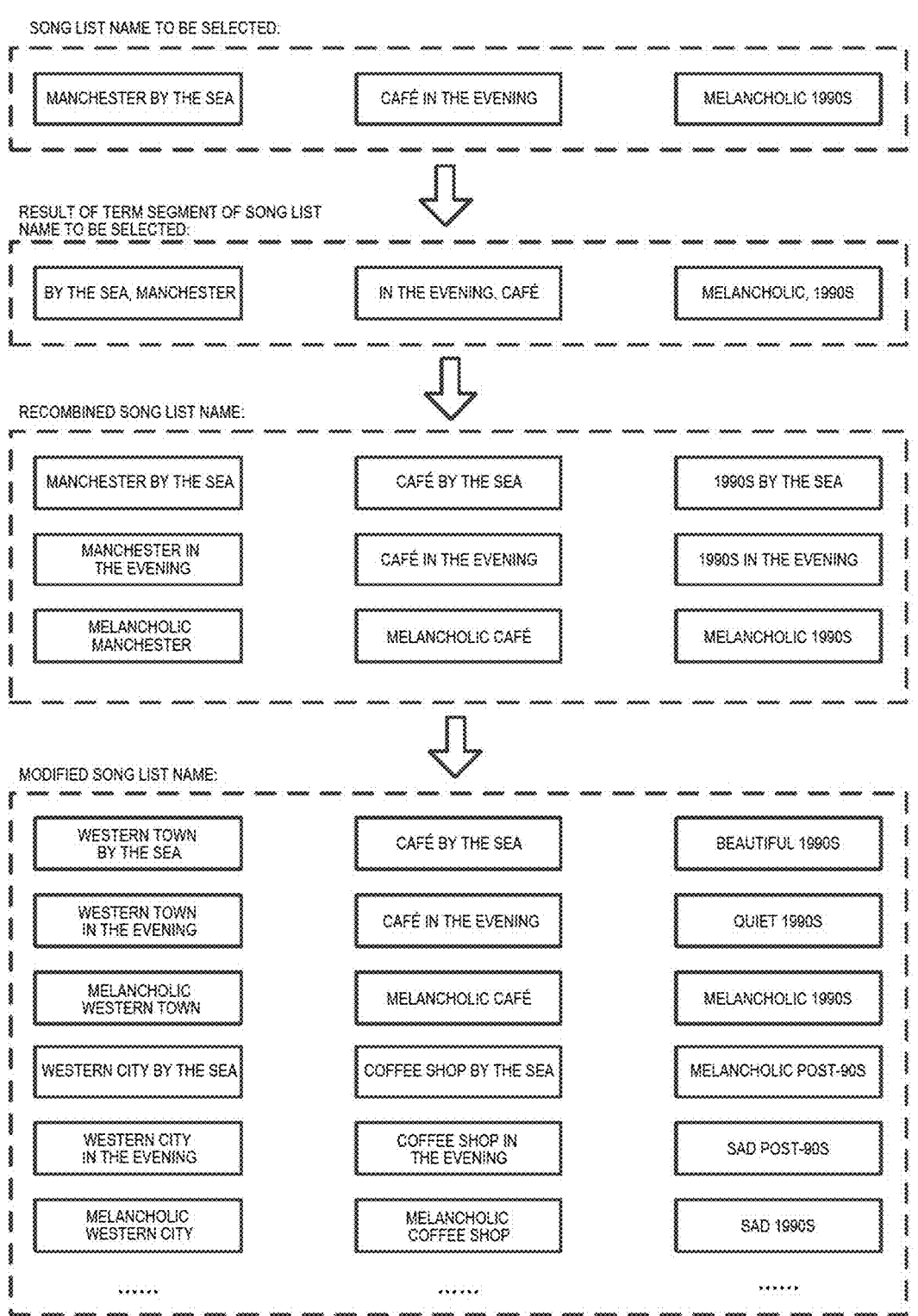
FIG. 6 is a schematic diagram of a process of determining a target song list name according to an embodiment of the present disclosure.

FIG. 6 is a schematic diagram of a process of determining a target song list name according to an embodiment of the present disclosure. As shown in FIG. 6, it is assumed that three song list names to be selected are determined according to the embodiment shown in FIG. 4, which are "Manchester by the sea", "Café in the evening", and "Melancholic 1900s", respectively.

Still with reference to FIG. 6, after term segmentation is performed on the song list name to be selected "Manchester by the sea", two terms are obtained, which are "Sea" and "Manchester", respectively. After term segmentation is performed on the song list name to be selected "Café in the evening", two terms are obtained, which are "Evening" and "Café", respectively. After term segmentation processing is performed on the song list name to be selected "Melancholic 1900s", two terms are obtained, which are "Melancholic" and "1990s", respectively.

In S502, a plurality of terms corresponding to the at least one multimedia identifier to be selected are combined to obtain a plurality of recombined multimedia identifiers.

In this embodiment, each multimedia identifier to be selected is segmented to obtain a plurality of terms. The plurality of recombined multimedia identifiers may be obtained by recombining the terms from different multimedia identifiers to be selected.

Still with reference to FIG. 6, a plurality of terms (by the sea, Manchester, in the evening, Café, Melancholic, and 1990s) obtained after term segmentation are combined to obtain a plurality of recombined song list names, such as: Manchester by the sea, Manchester in the evening, Melancholic Manchester, Café by the sea, Café in the evening, Melancholic Café, 1990s by the sea, 1990s in the evening, and Melancholic 1990s.

It can be understood that in this embodiment, by combining a plurality of terms corresponding to the respective multimedia identifiers to be selected, the recombined multimedia identifiers may be generated, which are consistent with the multimedia features corresponding to the first multimedia information set and are more diversified in semantic meaning.

In S503: the plurality of recombined multimedia identifiers are modified to obtain a plurality of modified multimedia identifiers.

It should be understood that the recombined multimedia identifiers obtained after the above recombination may not meet a requirement of multimedia naming, and therefore, modification may be performed on the recombined multimedia identifiers, so that the obtained modified multimedia identifier meets the requirement of multimedia naming.

In some possible implementations, at least one of the following processing may be performed on each of the recombined multimedia identifiers to obtain a modified multimedia identifier:

Processing 1: a first predetermined term in the recombined multimedia identifier is deleted.

The first predetermined term is a term forbidden in a multimedia identifier according to a requirement of multimedia naming, and includes, but is not limited to, an uncivilized term, a racial discrimination term, and/or the like.

Alternatively, the recombined multimedia identifier may be processed through a pre-trained recognition model, so as to delete the first predetermined term in the recombined multimedia identifier. For example, a recombined multimedia identifier is input into a recognition model. The recognition model detects whether the first predetermined term is present in the recombined multimedia identifier; and if so, deletion is performed; and the multimedia identifier after the deletion is output.

In an example, the above recognition model may use a Bidirectional Encoder Representation from Transformer (BERT) model.

Processing 2: a predetermined type of terms are replaced in the recombined multimedia identifier, where the predetermined type includes a person name and/or a place name.

An example will be described with reference to FIG. 6. A recombined song list name "Manchester by the sea" contains a place name "Manchester", and the place name may be replaced according to a position and a characteristic corresponding to the place name, for example, with "Western Town"; and thus an obtained modified song list is "Western Town by the sea".

Similarly, if the recombined media identifier contains a person name, replacement may be performed on the person name in a similar way. For example, the person name is replaced with "boy", "girl", "woman" and/or the like.

Alternatively, a replacement model may be obtained through pre-training, and replacement is performed on a predetermined type of terms in the recombined multimedia identifier. For example, a recombined multimedia identifier is input into a replacement model; the replacement model detects whether the recombined multimedia identifier contains a predetermined term such as a place name and a person name; and if so, the predetermined term is replaced accordingly, and the replaced multimedia identifier is output.

In an example, the replacement model may be a BERT model. A replacement process for a place name and a person name may use the same replacement model, and may also use different replacement models. No limitation is suggested in this embodiment.

Processing 3: a term incompliant to the grammar is updated in the recombined media identifier.

In this embodiment, terms that do not conform to the grammar include, but are not limited to, a term with an unreasonable combination, a term with unsmooth texts, and/or the like. For example, if the recombined multimedia identifier includes "a branch of apple", there is also a case that the combination is unreasonable, and it may be updated to "an apple". For example, if the recombined media identifier includes "one one penguin", the text is unsmooth, and it may be updated to "one penguin".

Still with reference to FIG. 6, the recombined song list name "1990s in the evening" and "1990s by the sea" have unreasonable combinations, and can be updated to "Beautiful 1990s", "Quiet 1990s", and/or the like.

Alternatively, an update model may be obtained through pre-training, and the terms that do not conform to the grammar in the recombined multimedia identifier are updated. For example, a recombined multimedia identifier is input into an update model, and the update model detects whether the recombined multimedia identifier contains a term that does not conform to a syntax. If so, the update model correspondingly updates the term that does not conform to the syntax, and outputs the updated multimedia identifier. In an example, the replacement model as described above may be a BERT model.

Processing 4: synonym replacement is performed on a term in the recombined multimedia identifier.

An example is described with reference to FIG. 6. "Coffee shop by the sea" may be obtained by performing synonym replacement for the recombined media identifier "Café by the sea". With regard to the recombined media identifier "Melancholic 1900s", "Melancholic post-90s", "Sad 1900s", "Sad post-90s", and/or the like may be obtained by means of synonym replacement. It should be noted that the modified song list names illustrated in FIG. 6 are only some examples, and no limitation is suggested in this embodiment.

It should be understood that after the synonym replacement, the number of the recombined multimedia identifiers is further increased, so that the recombined multimedia identifiers are more abundant.

Processing 5: a recombined multimedia identifier with the number of characters less than or equal to a predetermined threshold is deleted.

It can be understood that when the number of characters included in a recombined multimedia identifier is relatively small, for example, the number of characters is less than or equal to 4, it is usually difficult to express complete semantic information; therefore, in this embodiment, if the number of characters in a recombined multimedia identifier is less than or equal to a predetermined threshold, the recombined multimedia identifier may be deleted.

It should be noted that in an actual application, each recombined multimedia identifier may be processed by using one or more of the above five processing approaches to obtain one or more modified multimedia identifiers, if a plurality of processing approaches are adopted, an order of the plurality of processing approaches is not limited.

In S504, the target multimedia identifier is determined from the plurality of modified multimedia identifiers.

In this embodiment, a target reference multimedia identifier may be determined among a plurality of reference multimedia identifiers, where a matching degree between a multimedia feature corresponding to the target reference multimedia identifier and a multimedia feature corresponding to the first multimedia information set is the highest. Alternatively, the above similarity may be determined according to a reference label set corresponding to each reference multimedia identifier and the first label set. An example will be described with reference to FIG. 4. In FIG. 4, reference label set 4 is the same as the first label set, and this indicates that the feature matching degree between reference song list 4 and the song list to be named is the highest, and thus the reference song list 4 may be taken as the target reference multimedia identifier.

Further, a similarity degree between each modified multimedia identifier and the target reference multimedia identifier is obtained; and the target multimedia identifier is determined from the plurality of modified multimedia identifiers according to similarity degrees between the respective modified multimedia identifiers and the target reference multimedia identifier.

In an example, the modified multimedia identifier with the highest similarity degree between the plurality of modified multimedia identifiers and the target reference multimedia identifier is determined as the target multimedia identifier. In this example, the determined number of the target multimedia identifiers is 1.

In another example, the plurality of modified multimedia identifiers are sorted in a descending order of the similarity degrees between the respective modified multimedia identifiers and the target reference multimedia identifier, and the top M modified multimedia identifiers after the sorting are determined as the target multimedia identifiers. In this example, the determined number of the target multimedia identifiers is M, where M is an integer greater than or equal to 1.

In this embodiment, a plurality of recombined multimedia identifiers are obtained by combining terms in a plurality of multimedia identifiers to be selected, so as to generate a plurality of recombined multimedia identifiers that have multimedia features consistent with those corresponding to the first multimedia information and are more diversified in semantics. Further, a plurality of recombined multimedia identifiers are modified to obtain a plurality of modified multimedia identifiers, and a target multimedia identifier is determined from the plurality of modified multimedia identifiers, thereby ensuring that the determined target multimedia identifier satisfies a requirement of multimedia naming, and improving the quality of the target multimedia identifier.

Figure 7:
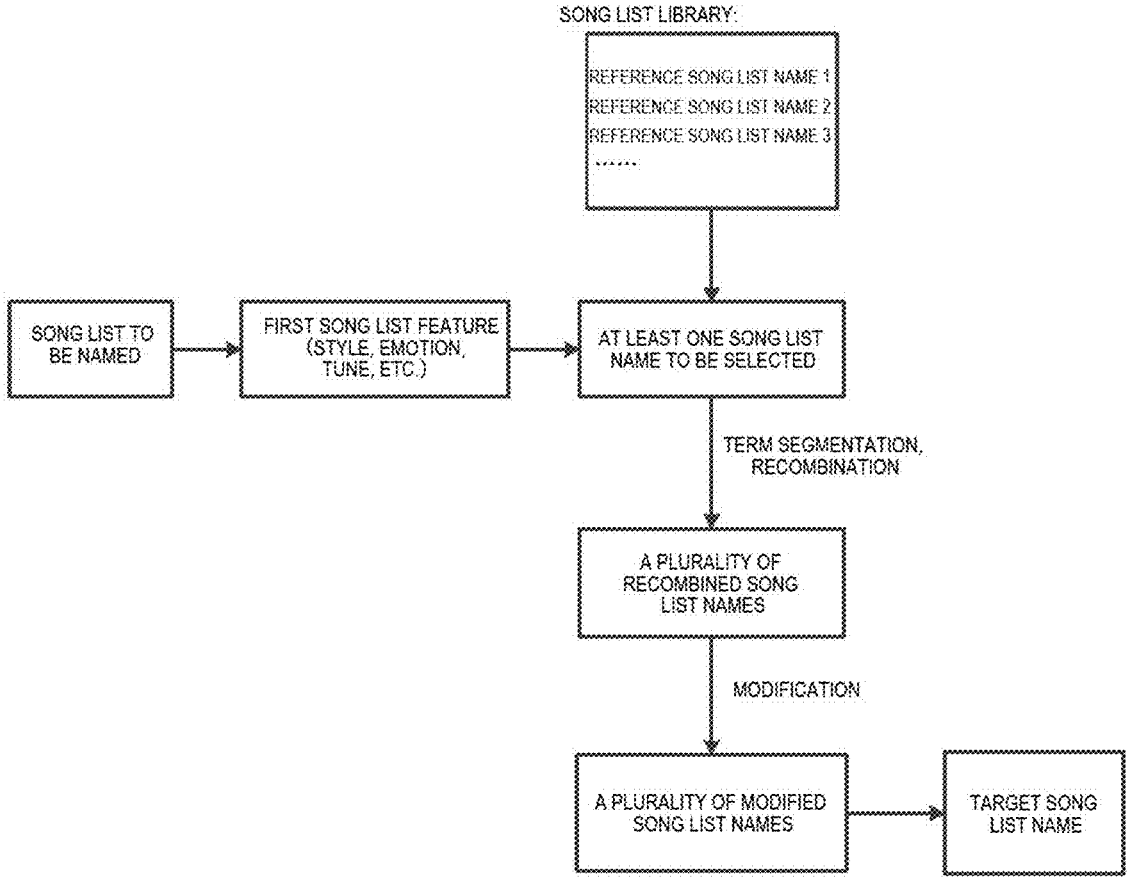
FIG. 7 is a schematic diagram of a process for information processing according to an embodiment of the present disclosure.

FIG. 7 is a schematic diagram of a process for information processing according to an embodiment of the present disclosure. As shown in FIG. 7, taking a song list as an example, the process for information processing of this embodiment includes:

(1) A first song list feature is determined according to a song list to be named, where the first song list feature may include features in a plurality of dimensions such as a style, an emotion, and a tune.

For a process of performing feature extraction on the song list to be named, reference may be made to the description of the embodiments shown in FIG. 2.

(2) At least one song list name to be selected is determined according to the first song list feature, from a plurality of reference song list names stored in the song list.

The matching degree between the reference song list feature corresponding to the song list name to be selected and the first song list feature satisfies a predetermined condition. For a process of determining at least one song list name to be selected from the song list library, reference may be made to the detailed description of the embodiments shown in FIG. 3 or FIG. 4.

(3) Terms in at least one of the list names to be selected are combined to obtain a plurality of recombined song list names.

(4) A plurality of recombined song list names are modified to obtain a plurality of modified song list names.

(5) A target song list name is determined from a plurality of modified song list names.

For the processes of combining and modifying terms in at least one of the song list names to be selected, and determining the target song list name, reference can be made to the detailed description of the embodiments shown in FIG. 5.

Figure 8:
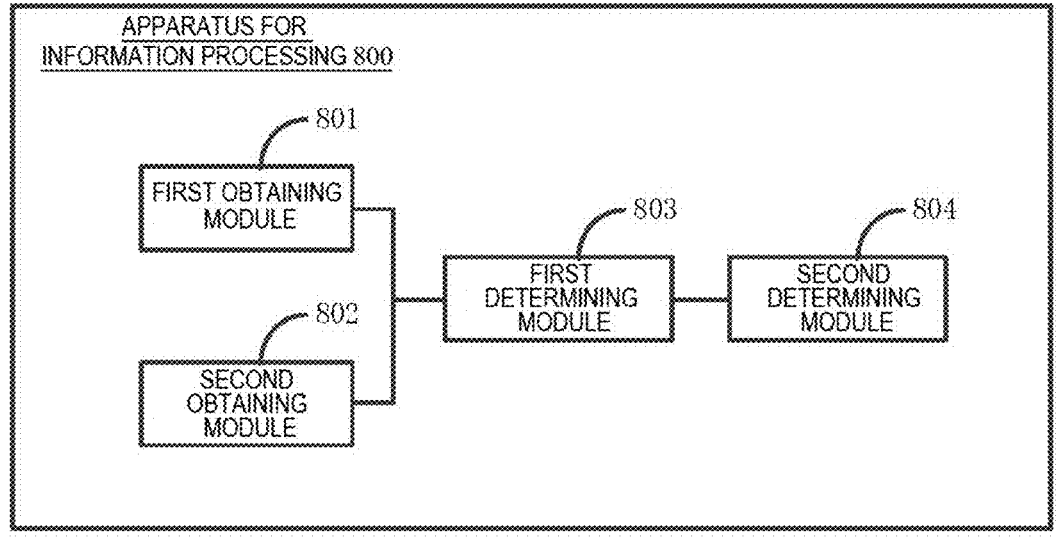
FIG. 8 is a schematic structural diagram of an apparatus for information processing according to an embodiment of the present disclosure.

FIG. 8 is a schematic structural diagram of an apparatus for information processing according to an embodiment of the present disclosure. The apparatus may be a terminal device/server, or a processor, a chip, a chip module, a module, a unit, an application program, or the like integrated into the terminal device/server.

As shown in FIG. 8, the apparatus for information processing 800 provided in this embodiment includes: a first obtaining module 801, a second obtaining module 802, a first determining module 803, and a second determining module 804.

The first acquisition module 801 is configured to obtain a first multimedia information set to be processed, the first multimedia information set including a plurality of first multimedia information;

The second obtaining module 802 is configured to obtain reference information, the reference information including a plurality of reference multimedia identifiers, one of the reference multimedia identifiers being used to indicate a reference multimedia information set, the reference multimedia information set including a plurality of reference multimedia information.

The first determining module 803 is configured to determine at least one multimedia identifier to be selected, according to the first multimedia information set, from the plurality of reference multimedia identifiers, a matching degree between a multimedia feature corresponding to a reference multimedia information set indicated by the at least one multimedia identifier to be selected and a multimedia feature corresponding to the first multimedia information set satisfying a predetermined condition.

The second determining module 804 is configured to determine, according to the at least one multimedia identifier to be selected, a target multimedia identifier corresponding to the first multimedia information set.

In a possible implementation, the first determining module 803 is specifically configured to:

determine a first label set according to the multimedia feature corresponding to the first multimedia information set, the first label set including at least one feature label;

determine, according to a multimedia feature corresponding to a reference multimedia information set indicated by each of the reference multimedia identifiers, a reference label set corresponding to the reference multimedia identifier, the reference label set including at least one feature label; and determine the at least one multimedia identifier to be selected, from the plurality of reference multimedia identifiers according to the first label set and reference label sets corresponding to respective reference multimedia identifiers of the reference multimedia identifiers.

In a possible implementation, the first determining module 803 is specifically configured to:

determine a plurality of reference feature labels, according to the reference label sets corresponding to the respective reference multimedia identifiers, a repeated feature label being absent in the plurality of reference feature labels;

determine, according to the respective reference multimedia identifiers and the reference label sets corresponding to the respective reference multimedia identifiers, a set of reference multimedia identifiers corresponding to each of the reference feature labels; and determine the at least one multimedia identifier to be selected, from the plurality of reference multimedia identifiers according to the first label set and the set of reference multimedia identifiers corresponding to each of the reference feature labels.

In a possible implementation, the first determining module 803 is specifically configured to:

determine at least one target feature label from the plurality of reference feature labels according to the first label set, the target feature label belonging to the first label set; and determine the at least one multimedia identifier to be selected, according to the set of reference multimedia identifiers corresponding to the at least one target feature label.

In a possible implementation, the second determining module 804 is specifically configured to:

segment each of the at least one multimedia identifier to be selected to obtain a plurality of terms corresponding to the at least one multimedia identifier to be selected;

combine the plurality of terms corresponding to the at least one multimedia identifier to be selected to obtain a plurality of recombined multimedia identifiers;

modify the plurality of recombined multimedia identifiers to obtain a plurality of modified multimedia identifiers; and determine the target multimedia identifier from the plurality of modified multimedia identifiers.

In a possible implementation, for any one of the plurality of recombined media identifiers, the second determining module 804 is specifically configured to:

perform at least one of the following on the recombined multimedia identifier to obtain the modified multimedia identifiers:

deleting a first predetermined term in the recombined multimedia identifiers;

replacing a predetermined type of terms in the recombined multimedia identifier, the predetermined type including a person name and/or a place name;

updating a term incompliant to a grammar in the recombined multimedia identifier;

performing synonym replacement on a term in the recombined multimedia identifier; and deleting a recombined multimedia identifier with a number of characters less than or equal to a predetermined threshold, in the recombined multimedia identifier.

In a possible implementation, the second determining module 804 is specifically configured to:

determine a target reference multimedia identifier from the plurality of reference multimedia identifiers, a matching degree between a multimedia feature corresponding to the target reference multimedia identifier and the multimedia feature corresponding to the first multimedia information set being highest;

obtain a similarity degree between each of the modified multimedia identifiers and the target reference multimedia identifier; and determine the target multimedia identifier from the plurality of modified multimedia identifiers according to similarity degrees between respective modified multimedia identifiers of the modified multimedia identifiers and the target reference multimedia identifier.

In a possible implementation, the second determining module 804 is specifically configured to:

sort the plurality of modified multimedia identifiers, according to a descending order of the similarity degrees between the respective modified multimedia identifiers and the target reference multimedia identifier; and determine first M modified multimedia identifiers after the sorting, as target multimedia identifiers, M being an integer greater than or equal to 1.

In a possible implementation, the first multimedia information is any one of: an audio, a text, an image, or a video.

In a possible implementation, the first multimedia information is a song, and the multimedia feature includes a feature in one or more dimensions of a style, an emotion, and a type.

In a possible implementation approach, the apparatus in this embodiment further includes:

a setting module configured to set an identifier of the first multimedia information set as the target multimedia identifier; or a display module configured to display the target multimedia identifier; or a sending module configured to send the target multimedia identifier to a predetermined device.

The apparatus for information processing provided in this embodiment may be configured to perform the method of information processing in any one of the above method embodiments, and implementation principles and technical effects of the apparatus of information processing are similar, which are not repeated.

In order to implement the described embodiments, the embodiments of the present disclosure further provide an electronic device.

Figure 9:
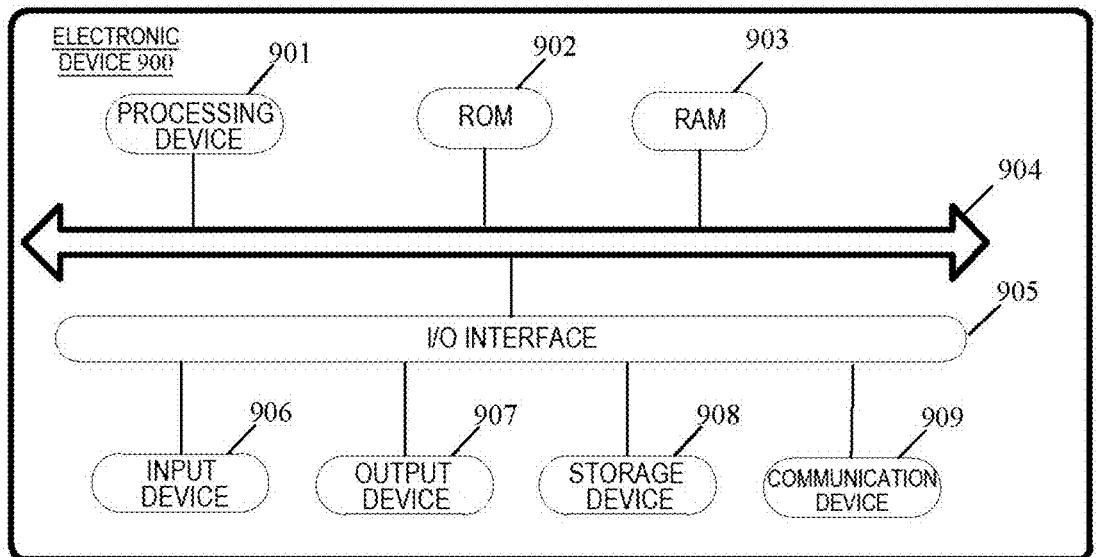
FIG. 9 is a schematic diagram of a structure of an electronic device according to an embodiment of the present disclosure.

Reference is to FIG. 9 which shows a schematic structural diagram of an electronic device 900 suitable for implementing embodiments of the present disclosure. The electronic device 900 may be a terminal device or a server. The terminal device may include, but is not limited to, a mobile terminal such as a mobile phone, a laptop computer, a digital broadcast receiver, a personal digital assistant (PDA), a tablet computer (Portable Android Device, PAD for short), a portable multimedia player (Portable Media Player, PMP for short), a vehicle-mounted terminal (for example, a vehicle-mounted navigation terminal), and/or the like, and a fixed terminal such as a digital television (TV), a desktop computer, and/or the like. The electronic device shown in FIG. 9 is only an example and not suggest any limitation to the functions and use scope of the embodiments of the present disclosure.

As shown in FIG. 9, the electronic device 900 may include a processing device (e. g., a central processing unit, a graphics processor, etc.) 901 that may perform various suitable actions and processes in accordance with a program stored in a read only memory (ROM) 902 or a program loaded into a random access memory (RAM) 903 from a storage device 908. A plurality of programs and data necessary for the operation of the electronic device 900 are also stored in the RAM 903. The processing device 901, the ROM 902, and the RAM 903 are connected to each other via a bus 904. An input/output (I/O) interface 905 is also connected to the bus 904.

In general, the following devices may be connected to the I/O interface 905: an input device 906 including, for example, a touch screen, a touch pad, a keyboard, a mouse, a camera, a microphone, an accelerometer, a gyroscope, and the like; an output device 907 including, for example, a liquid crystal display (LCD), a speaker, a vibrator, and the like; the storage device 908 including, for example, a magnetic tape, a hard disk, and the like; and a communication device 909. The communication device 909 may allow the electronic device 900 to communicate in wireless or wired ways with other device to exchange data. While FIG. 9 illustrates the electronic device 900 having various devices, it should be understood that it is not required to implement or have all of the illustrated devices. More or fewer device s may alternatively be implemented or provided.

In particular, according to embodiments of the present disclosure, the processes described above with reference to the flowcharts may be implemented as computer software programs. For example, embodiments of the present disclosure include a computer program product including a computer program carried on a computer readable medium. The computer program comprises a program code for performing the method as shown in the flowchart. In such embodiments, the computer program may be downloaded and installed from the network through the communication device 909, or installed from the storage device 908, or installed from the ROM 902. When the computer program is executed by the processing device 901, the above-described functions defined in the method are performed, according to embodiments of the present disclosure.

It should be noted that the computer readable medium described above in the present disclosure may be a computer readable signal medium or a computer readable storage medium, or any combination of the above. The computer-readable storage medium may be, for example, but is not limited to, an electronic, magnetic, optical, electromagnetic, infrared, or semiconductor system, apparatus, or device, or any suitable combination of the above. More specific examples of the computer readable storage medium may include, but are not limited to, an electrical connection having one or more cables, a portable computer disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the above. In the present disclosure, a computer readable storage medium may be any tangible medium that may contain or store a program that may be used by or in combination with an instruction execution system, apparatus, or device. While in the present disclosure, a computer readable signal medium may include a data signal propagated in a baseband or as part of a carrier wave carrying computer readable program code. Such propagated signals may take a variety of forms, including, but not limited to, electromagnetic signals, optical signals, or any suitable combination of the above. The computer readable signal medium may also be any computer readable medium, other than a computer readable storage medium, which transmits, propagates or communicates a program for use by or in connection with an instruction-executing system, apparatus or device. The program code included in the computer readable medium may be transmitted by any suitable medium, including, but not limited to: a cable, an optical fiber, RF (radio frequency) and/or the like, or any suitable combination of the above.

The above computer readable medium may be included in the above electronic device, or may exist separately and not be installed in the electronic device.

The above computer readable medium carries one or more programs, and when the one or more programs are executed by the electronic device, the one or more programs cause the electronic device to execute the method shown in the above embodiments.

Computer program code for performing the operations of the present disclosure may be written in one or more programming languages or combinations thereof, including an object-oriented programming language such as Java, Smalltalk, C++ and/or the like and conventional procedural programming languages, such as the "C" language or similar programming languages. The program code may be executed entirely on the user's computer, partly on the user's computer, as a stand-alone software package, partly on the user's computer and partly on a remote computer or entirely on the remote computer or server. In the case involving a remote computer, the remote computer may be connected to the user's computer through any type of network, including a local area network (LAN) or a wide area network (WAN), or connected to an external computer (for example, over the Internet via an Internet service provider).

The flowcharts and block diagrams in the accompanying drawings illustrate the architecture, functionality and operation of systems, methods and computer program products that may be implemented according to various embodiments of the present disclosure. In this regard, each block in the flowchart or block diagrams may represent a module, a program segment, or a portion of code, which comprises one or more executable instructions for implementing the specified logical function(s). It should also be noted that, in some alternative implementations, the functions noted in the blocks may occur in a different order than that noted in the accompanying drawings. For example, two consecutively represented blocks may actually be executed substantially in parallel, and they may sometimes be executed in a reverse order, depending upon the functionality involved. It should also be noted that each block in the block diagrams and/or flowchart, and combinations of the blocks in the block diagrams and/or flowcharts, may be implemented with a dedicated hardware-based system that performs the specified function or operation, or may be implemented with a combination of dedicated hardware and computer instructions.

The units described in the embodiments of the present disclosure may be implemented by software or hardware. Herein, the name of the unit does not constitute a limitation to the unit itself in some cases. For example, the first obtaining unit may also be described as "a unit to obtain at least two internet protocol addresses".

The functions described herein above may be performed, at least in part, by one or more hardware logic components. For example, without limitation, example types of hardware logic components that may be used include: Field-programmable Gate Arrays (FPGAs), Program-specific Integrated Circuits (ASICs), Program-specific Standard Products (AS-SPs), System-on-a-chip systems (SOCs), Complex Programmable Logic Devices (CPLDs), and/or the like.

In the context of this disclosure, a machine-readable medium may be a tangible medium that may contain or store a program for use by or in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above. More specific examples of machine-readable storage medium would include an electrical connection based on one or more cables, a portable computer disk, a hard disk, a random access memory (RAM), a read-only memory (ROM), an erasable programmable read-only memory (EPROM or flash memory), an optical fiber, a convenient compact disc read-only memory (CD-ROM), an optical storage device, a magnetic storage device, or any suitable combination of the above.

In a first aspect, according to one or more embodiments of the present disclosure, a method of information processing is provided, including:

obtaining a first multimedia information set to be processed, the first multimedia information set including a plurality of first multimedia information;

obtaining reference information, the reference information including a plurality of reference multimedia identifiers, one of the reference multimedia identifiers being used to indicate a reference multimedia information set, and the reference multimedia information set including a plurality of reference multimedia information;

determining at least one multimedia identifier to be selected, from the plurality of reference multimedia identifiers according to the first multimedia information set, a matching degree between a multimedia feature corresponding to a reference multimedia information set indicated by the at least one multimedia identifier to be selected and a multimedia feature corresponding to the first multimedia information set satisfying a predetermined condition; and determining, according to the at least one multimedia identifier to be selected, a target multimedia identifier corresponding to the first multimedia information set.

According to one or more embodiments of the present disclosure, determining the at least one multimedia identifier to be selected, from the plurality of reference multimedia identifiers according to the first multimedia information set includes:

determining a first label set according to the multimedia feature corresponding to the first multimedia information set, the first label set including at least one feature label;

determining, according to a multimedia feature corresponding to a reference multimedia information set indicated by each of the reference multimedia identifiers, a reference label set corresponding to the reference multimedia identifier, the reference label set including at least one feature label; and determining the at least one multimedia identifier to be selected, from the plurality of reference multimedia identifiers according to the first label set and reference label sets corresponding to respective reference multimedia identifiers of the reference multimedia identifiers.

According to one or more embodiments of the present disclosure, determining the at least one multimedia identifier to be selected, from the plurality of reference multimedia identifiers according to the first label set and the reference label sets corresponding to the respective reference multimedia identifiers includes:

determining a plurality of reference feature labels, according to the reference label sets corresponding to the respective reference multimedia identifiers, a repeated feature label being absent in the plurality of reference feature labels;

determining, according to the respective reference multimedia identifiers and the reference label sets corresponding to the respective reference multimedia identifiers, a set of reference multimedia identifiers corresponding to each of the reference feature labels; and determining the at least one multimedia identifier to be selected, from the plurality of reference multimedia identifiers according to the first label set and the set of reference multimedia identifiers corresponding to each of the reference feature labels.

According to one or more embodiments of the present disclosure, determining the at least one multimedia identifier to be selected, from the plurality of reference multimedia identifiers according to the first label set and the set of reference multimedia identifiers corresponding to each of the reference feature labels includes:

determining at least one target feature label from the plurality of reference feature labels according to the first label set, the target feature label belonging to the first label set; and determining the at least one multimedia identifier to be selected, according to the set of reference multimedia identifiers corresponding to the at least one target feature label.

According to one or more embodiments of the present disclosure, determining, according to the at least one multimedia identifier to be selected, the target multimedia identifier corresponding to the first multimedia information set includes:

segmenting each of the at least one multimedia identifier to be selected to obtain a plurality of terms corresponding to the at least one multimedia identifier to be selected;

combining the plurality of terms corresponding to the at least one multimedia identifier to be selected to obtain a plurality of recombined multimedia identifiers;

modifying the plurality of recombined multimedia identifiers to obtain a plurality of modified multimedia identifiers; and determining the target multimedia identifier from the plurality of modified multimedia identifiers.

According to one or more embodiments of the present disclosure, modifying the recombined multimedia identifiers to obtain the modified multimedia identifiers comprises for any one of the recombined multimedia identifiers:

performing at least one of the following on the recombined multimedia identifier to obtain the modified multimedia identifiers:

deleting a first predetermined term in the recombined multimedia identifiers;

replacing a predetermined type of terms in the recombined multimedia identifier, the predetermined type including a person name and/or a place name;

updating a term incompliant to a grammar in the recombined multimedia identifier;

performing synonym replacement on a term in the recombined multimedia identifier; and deleting a recombined multimedia identifier with a number of characters less than or equal to a predetermined threshold, in the recombined multimedia identifier.

According to one or more embodiments of the present disclosure, determining the target multimedia identifier from the plurality of modified multimedia identifiers includes:

determining a target reference multimedia identifier from the plurality of reference multimedia identifiers, a matching degree between a multimedia feature corresponding to the target reference multimedia identifier and the multimedia feature corresponding to the first multimedia information set being highest;

obtaining a similarity degree between each of the modified multimedia identifiers and the target reference multimedia identifier; and determining the target multimedia identifier from the plurality of modified multimedia identifiers according to similarity degrees between respective modified multimedia identifiers of the modified multimedia identifiers and the target reference multimedia identifier.

According to one or more embodiments of the present disclosure, determining the target multimedia identifier from the plurality of modified multimedia identifiers according to the similarity degrees between the respective modified multimedia identifiers and the target reference multimedia identifier includes:

sorting the plurality of modified multimedia identifiers, according to a descending order of the similarity degrees between the respective modified multimedia identifiers and the target reference multimedia identifier; and determining first M modified multimedia identifiers after the sorting, as target multimedia identifiers, M being an integer greater than or equal to 1.

According to one or more embodiments of the present disclosure, the first multimedia information is any one of: an audio, a text, an image, or a video.

According to one or more embodiments of the present disclosure, the first multimedia information is a song, and the multimedia feature includes a feature in one or more dimensions of a style, an emotion, and a type.

According to one or more embodiments of the present disclosure, after determining, according to the at least one multimedia identifier to be selected, the target multimedia identifier corresponding to the first multimedia information set, the method further includes:

setting an identifier of the first multimedia information set as the target multimedia identifier; or displaying the target multimedia identifier; or sending the target multimedia identifier to a predetermined device.

In a second aspect, according to one or more embodiments of the present disclosure, an apparatus for information processing is provided, including:

a first obtaining module configured to obtain a first multimedia information set to be processed, the first multimedia information set including a plurality of first multimedia information;

a second obtaining module configured to obtain reference information, the reference information including a plurality of reference multimedia identifiers, one of the reference multimedia identifiers being used to indicate a reference multimedia information set, the reference multimedia information set including a plurality of reference multimedia information;

a first determining module configured to determine at least one multimedia identifier to be selected, according to the first multimedia information set, from the plurality of reference multimedia identifiers, a matching degree between a multimedia feature corresponding to a reference multimedia information set indicated by the at least one multimedia identifier to be selected and a multimedia feature corresponding to the first multimedia information set satisfying a predetermined condition; and a second determining module configured to determine, according to the at least one multimedia identifier to be selected, a target multimedia identifier corresponding to the first multimedia information set.

According to one or more embodiments of the present disclosure, the first determining module is specifically configured to:

determine a first label set according to the multimedia feature corresponding to the first multimedia information set, the first label set including at least one feature label;

determine, according to a multimedia feature corresponding to a reference multimedia information set indicated by each of the reference multimedia identifiers, a reference label set corresponding to the reference multimedia identifier, the reference label set including at least one feature label; and determine the at least one multimedia identifier to be selected, from the plurality of reference multimedia identifiers according to the first label set and reference label sets corresponding to respective reference multimedia identifiers of the reference multimedia identifiers.

According to one or more embodiments of the present disclosure, the first determining module is specifically configured to:

determine a plurality of reference feature labels, according to the reference label sets corresponding to the respective reference multimedia identifiers, a repeated feature label being absent in the plurality of reference feature labels;

determine, according to the respective reference multimedia identifiers and the reference label sets corresponding to the respective reference multimedia identifiers, a set of reference multimedia identifiers corresponding to each of the reference feature labels; and determine the at least one multimedia identifier to be selected, from the plurality of reference multimedia identifiers according to the first label set and the set of reference multimedia identifiers corresponding to each of the reference feature labels.

According to one or more embodiments of the present disclosure, the first determining module is specifically configured to:

determine at least one target feature label from the plurality of reference feature labels according to the first label set, the target feature label belonging to the first label set; and determine the at least one multimedia identifier to be selected, according to the set of reference multimedia identifiers corresponding to the at least one target feature label.

According to one or more embodiments of the present disclosure, the second determining module is specifically configured to:

segment each of the at least one multimedia identifier to be selected to obtain a plurality of terms corresponding to the at least one multimedia identifier to be selected;

combine the plurality of terms corresponding to the at least one multimedia identifier to be selected to obtain a plurality of recombined multimedia identifiers;

modify the plurality of recombined multimedia identifiers to obtain a plurality of modified multimedia identifiers; and determine the target multimedia identifier from the plurality of modified multimedia identifiers.

According to one or more embodiments of the present disclosure, for any one of the plurality of recombined media identifiers, the second determining module is specifically configured to:

perform at least one of the following on the recombined multimedia identifier to obtain the modified multimedia identifiers:

deleting a first predetermined term in the recombined multimedia identifiers;

replacing a predetermined type of terms in the recombined multimedia identifier, the predetermined type including a person name and/or a place name;

updating a term incompliant to a grammar in the recombined multimedia identifier;

performing synonym replacement on a term in the recombined multimedia identifier; and deleting a recombined multimedia identifier with a number of characters less than or equal to a predetermined threshold, in the recombined multimedia identifier.

According to one or more embodiments of the present disclosure, the second determining module is specifically configured to:

determine a target reference multimedia identifier from the plurality of reference multimedia identifiers, a matching degree between a multimedia feature corresponding to the target reference multimedia identifier and the multimedia feature corresponding to the first multimedia information set being highest;

obtain a similarity degree between each of the modified multimedia identifiers and the target reference multimedia identifier; and determine the target multimedia identifier from the plurality of modified multimedia identifiers according to similarity degrees between respective modified multimedia identifiers of the modified multimedia identifiers and the target reference multimedia identifier.

According to one or more embodiments of the present disclosure, the second determining module is specifically configured to:

sort the plurality of modified multimedia identifiers, according to a descending order of the similarity degrees between the respective modified multimedia identifiers and the target reference multimedia identifier; and determine first M modified multimedia identifiers after the sorting, as target multimedia identifiers, M being an integer greater than or equal to 1.

According to one or more embodiments of the present disclosure, the first multimedia information is any one of: an audio, a text, an image, or a video.

According to one or more embodiments of the present disclosure, the first multimedia information is a song, and the multimedia feature includes a feature in one or more dimensions of a style, an emotion, and a type.

According to one or more embodiments of the present disclosure, the apparatus for information processing further includes:

a setting module configured to set an identifier of the first multimedia information set as the target multimedia identifier; or a display module configured to display the target multimedia identifier; or a sending module configured to send the target multimedia identifier to a predetermined device.

In a third aspect, according to one or more embodiments of the present disclosure, there is provided an electronic device, including: at least one processor and a memory;

the memory storing computer executable instructions; and the at least one processor executing the computer executable instructions stored in the memory to implement the method of information processing according to the first aspect and various possible implementations of the first aspect.

In a fourth aspect, a computer readable storage medium is provided according to one or more embodiments of the present disclosure. The computer readable storage medium stores computer executable instructions, and the computer executable instructions, when executed by a processor, implement the method of information processing according to the first aspect and various possible implementations of the first aspect.

In a fifth aspect, according to one or more embodiments of the present disclosure, a computer program product is provided, including a computer program, where the computer program, when executed by a processor, implements the method of information processing according to the first aspect and various possible implementations of the first aspect.

In a sixth aspect, according to one or more embodiments of the present disclosure, a computer program is provided, where the computer program, when executed by a processor, implements the method of information processing according to the first aspect and various possible implementations of the first aspect.

The above description is only illustration of example embodiments of the present disclosure and the technical principles applied thereto. It should be understood by those skilled in the art that the scope of the disclosure involved in the present disclosure is not limited to the technical solution formed by the specific combination of the above technical features, but also covers other technical solutions formed by any combination of the above technical features or their equivalent features without departing from the above disclosed concept, for example, a technical solution formed by replacing the above-mentioned features and the technical features having similar functions as disclosed in the present disclosure (but not limited to those technical features) from each other.

In addition, although the operations are depicted in a particular order, this should not be understood as requiring that the operations are performed in the particular order shown or in a sequential order. Multitasking and parallel processing may be advantageous in certain circumstances. Likewise, although several specific implementation details are included in the above discussion, these should not be construed as limiting the scope of the present disclosure. Certain features that are described in the context of separate embodiments may also be implemented in combination in a single embodiment. Conversely, various features that are described in the context of a single embodiment may also be implemented in a plurality of embodiments, either individually or in any suitable sub-combination.

Although the present subject matter has been described in language specific to structural features and/or methodological actions, it should be understood that the subject matter defined in the appended claims is not necessarily limited to the specific features or actions described above. Rather, the specific features and actions described above are only example forms of implementing the claims.

What is claimed is:

1. A method of automatically generating identifiers for multimedia information sets, comprising:
   receiving a request to automatically generate an identifier for a first multimedia information set from a user device, wherein the first multimedia information set comprises a plurality of first multimedia items;
   extracting features from the first multimedia information set based on receiving the request and classifying the extracted features in a plurality of dimensions to generate a first set of feature labels corresponding to the first multimedia information set;
   extracting features from each of a plurality of reference multimedia information sets stored in a library and classifying the extracted features in the plurality of dimensions to generate a plurality of sets of reference feature labels, wherein each of the plurality of reference multimedia information sets corresponds to one of a plurality of reference multimedia identifiers, wherein each of the plurality of sets of reference feature labels corresponds to one of the plurality of reference multimedia identifiers, and wherein each of the plurality of reference multimedia information sets comprises a plurality of reference multimedia items;
   computing a matching degree between the first set of feature labels and each of the plurality of sets of reference feature labels;
   selecting at least one multimedia identifier from the plurality of reference multimedia identifiers based on determining that the matching degree between the first set of feature labels and the set of reference feature labels corresponding to the selected at least one multimedia identifier satisfies a predetermined condition; and
   segmenting the selected at least one multimedia identifier into a plurality of terms and combining at least a portion of the plurality of terms to determine the identifier for the first multimedia information set.

2. The method of claim 1, wherein selecting the at least one multimedia identifier from the plurality of reference multimedia identifiers comprises:
   determining a plurality of reference feature labels, according to the plurality of sets of reference feature labels, a repeated feature label being absent in the plurality of reference feature labels;
   determining, according to the respective reference multimedia identifiers and the plurality of sets of reference feature labels, a set of reference multimedia identifiers corresponding to each of the reference feature labels; and
   determining the at least one multimedia identifier, from the plurality of reference multimedia identifiers according to the first set of feature labels and the set of reference multimedia identifiers corresponding to each of the reference feature labels.

3. The method of claim 2, wherein selecting the at least one multimedia identifier from the plurality of reference multimedia identifiers comprises:
   determining at least one target feature label from the plurality of reference feature labels according to the first set of feature labels, the target feature label belonging to the first set of feature labels; and
   determining the at least one multimedia identifier to be selected, according to the set of reference multimedia identifiers corresponding to the at least one target feature label.

4. The method of claim 1, wherein combining at least the portion of the plurality of terms comprises:
   combining the plurality of terms corresponding to the at least one multimedia identifier to be selected to obtain a plurality of recombined multimedia identifiers, the method further comprising:
   modifying the plurality of recombined multimedia identifiers to obtain a plurality of modified multimedia identifiers; and
   determining the target multimedia identifier from the plurality of modified multimedia identifiers.

5. The method of claim 4, wherein modifying the recombined multimedia identifiers to obtain the modified multimedia identifiers comprises for any one of the recombined multimedia identifiers:
   performing at least one of the following on the recombined multimedia identifier to obtain the modified multimedia identifiers:
   deleting a first predetermined term in the recombined multimedia identifiers;
   replacing a predetermined type of terms in the recombined multimedia identifier, the predetermined type including a person name and/or a place name;

updating a term incompliant to a grammar in the recombined multimedia identifier;

performing synonym replacement on a term in the recombined multimedia identifier; and deleting a recombined multimedia identifier with a number of characters less than or equal to a predetermined threshold, in the recombined multimedia identifier.

6. The method of claim 4, wherein determining the target multimedia identifier from the plurality of modified multimedia identifiers comprises:

determining a target reference multimedia identifier from the plurality of reference multimedia identifiers, a matching degree between a multimedia feature corresponding to the target reference multimedia identifier and the multimedia feature corresponding to the first multimedia information set being highest;

obtaining a similarity degree between each of the modified multimedia identifiers and the target reference multimedia identifier; and determining the target multimedia identifier from the plurality of modified multimedia identifiers according to similarity degrees between respective modified multimedia identifiers of the modified multimedia identifiers and the target reference multimedia identifier.

7. The method of claim 6, wherein determining the target multimedia identifier from the plurality of modified multimedia identifiers according to the similarity degrees between the respective modified multimedia identifiers and the target reference multimedia identifier comprises:

sorting the plurality of modified multimedia identifiers, according to a descending order of the similarity degrees between the respective modified multimedia identifiers and the target reference multimedia identifier; and determining first M modified multimedia identifiers after the sorting, as target multimedia identifiers, M being an integer greater than or equal to 1.

8. The method of claim 1, wherein each of the plurality of first multimedia items is any one of: an audio, a text, an image, or a video.

9. The method of claim 1, wherein each of the plurality of first multimedia items is a song, and where the plurality of dimensions comprises one or more of a style, an emotion, and a type.

10. The method of claim 1, after determining the identifier for the first multimedia information set, further comprising:

setting the identifier to be an identifier of the first multimedia information set; or displaying the identifier; or sending the identifier to a predetermined device.

11. An electronic device, comprising:

a processor and a memory;

the memory storing computer executable instructions; and the processor executing the computer executable instructions to implement acts comprising:

receiving a request to automatically generate an identifier for a first multimedia information set from a user device, wherein the first multimedia information set comprises a plurality of first multimedia items;

extracting features from the first multimedia information set based on receiving the request and classifying the extracted features in a plurality of dimensions to generate a first set of feature labels corresponding to the first multimedia information set;

extracting features from each of a plurality of reference multimedia information sets stored in a library and classifying the extracted features in the plurality of dimensions to generate a plurality of sets of reference feature labels, wherein each of the plurality of reference multimedia information sets corresponds to one of a plurality of reference multimedia identifiers, wherein each of the plurality of sets of reference feature labels corresponds to one of the plurality of reference multimedia identifiers, and wherein each of the plurality of reference multimedia information sets comprises a plurality of reference multimedia items;

computing a matching degree between the first set of feature labels and each of the plurality of sets of reference feature labels;

selecting at least one multimedia identifier from the plurality of reference multimedia identifiers based on determining that the matching degree between the first set of feature labels and the set of reference feature labels corresponding to the selected at least one multimedia identifier satisfies a predetermined condition; and segmenting the selected at least one multimedia identifier into a plurality of terms and combining at least a portion of the plurality of terms to determine the identifier for the first multimedia information set.

12. A non-transitory computer readable storage medium storing computer executable instructions, the computer executable instructions, when executed by a processor, implementing acts comprising:

receiving a request to automatically generate an identifier for a first multimedia information set from a user device, wherein the first multimedia information set comprises a plurality of first multimedia items;

extracting features from the first multimedia information set based on receiving the request and classifying the extracted features in a plurality of dimensions to generate a first set of feature labels corresponding to the first multimedia information set;

extracting features from each of a plurality of reference multimedia information sets stored in a library and classifying the extracted features in the plurality of dimensions to generate a plurality of sets of reference feature labels, wherein each of the plurality of reference multimedia information sets corresponds to one of a plurality of reference multimedia identifiers, wherein each of the plurality of sets of reference feature labels corresponds to one of the plurality of reference multimedia identifiers, and wherein each of the plurality of reference multimedia information sets comprises a plurality of reference multimedia items;

computing a matching degree between the first set of feature labels and each of the plurality of sets of reference feature labels;

selecting at least one multimedia identifier from the plurality of reference multimedia identifiers based on determining that the matching degree between the first set of feature labels and the set of reference feature labels corresponding to the selected at least one multimedia identifier satisfies a predetermined condition; and segmenting the selected at least one multimedia identifier into a plurality of terms and combining at least a portion of the plurality of terms to determine the identifier for the first multimedia information set.

13. The electronic device of claim 11, wherein selecting the at least one multimedia identifier from the plurality of reference multimedia identifiers comprises:

determining a plurality of reference feature labels, according to the plurality of sets of reference feature labels, a repeated feature label being absent in the plurality of reference feature labels;

determining, according to the respective reference multimedia identifiers and the plurality of sets of reference feature labels, a set of reference multimedia identifiers corresponding to each of the reference feature labels; and determining the at least one multimedia identifier, from the plurality of reference multimedia identifiers according to the first set of feature labels and the set of reference multimedia identifiers corresponding to each of the reference feature labels.

14. The electronic device of claim 13, wherein selecting the at least one multimedia identifier from the plurality of reference multimedia identifiers comprises:

determining at least one target feature label from the plurality of reference feature labels according to the first set of feature labels, the target feature label belonging to the first set of feature labels; and determining the at least one multimedia identifier to be selected, according to the set of reference multimedia identifiers corresponding to the at least one target feature label.

15. The electronic device of claim 11, wherein combining at least the portion of the plurality of terms comprises:

combining the plurality of terms corresponding to the at least one multimedia identifier to be selected to obtain a plurality of recombined multimedia identifiers, the method further comprising:

modifying the plurality of recombined multimedia identifiers to obtain a plurality of modified multimedia identifiers; and determining the target multimedia identifier from the plurality of modified multimedia identifiers.

16. The electronic device of claim 15, wherein modifying the recombined multimedia identifiers to obtain the modified multimedia identifiers comprises for any one of the recombined multimedia identifiers:

performing at least one of the following on the recombined multimedia identifier to obtain the modified multimedia identifiers;

deleting a first predetermined term in the recombined multimedia identifiers;

replacing a predetermined type of terms in the recombined multimedia identifier, the predetermined type including a person name and/or a place name;

updating a term incompliant to a grammar in the recombined multimedia identifier;

performing synonym replacement on a term in the recombined multimedia identifier; and deleting a recombined multimedia identifier with a number of characters less than or equal to a predetermined threshold, in the recombined multimedia identifier.

17. The electronic device of claim 15, wherein determining the target multimedia identifier from the plurality of modified multimedia identifiers comprises:

determining a target reference multimedia identifier from the plurality of reference multimedia identifiers, a matching degree between a multimedia feature corresponding to the target reference multimedia identifier and the multimedia feature corresponding to the first multimedia information set being highest;

obtaining a similarity degree between each of the modified multimedia identifiers and the target reference multimedia identifier; and determining the target multimedia identifier from the plurality of modified multimedia identifiers according to similarity degrees between respective modified multimedia identifiers of the modified multimedia identifiers and the target reference multimedia identifier.

18. The electronic device of claim 17, wherein determining the target multimedia identifier from the plurality of modified multimedia identifiers according to the similarity degrees between the respective modified multimedia identifiers and the target reference multimedia identifier comprises:

sorting the plurality of modified multimedia identifiers, according to a descending order of the similarity degrees between the respective modified multimedia identifiers and the target reference multimedia identifier; and determining first M modified multimedia identifiers after the sorting, as target multimedia identifiers, M being an integer greater than or equal to 1.

\*  \*  \*  \*  \*